J. HAAS.

Bearings for Shafts.

No. 5,732. Reissued Jan. 20, 1874.

Witnesses;
John L. Boone
C. M. Richardson

Inventor,
Jerome Haas
per Dewey & Co.
Attys.

UNITED STATES PATENT OFFICE.

JEROME HAAS, OF STOCKTON, CALIFORNIA.

IMPROVEMENT IN BEARINGS FOR SHAFTS.

Specification forming part of Letters Patent No. 86,392, dated February 2, 1869; reissue No. 5,732, dated January 20, 1874; application nled May 28, 1873.

*To all whom it may concern:*

Be it known that I, JEROME HAAS, of Stockton, San Joaquin county, State of California, have invented an Improved Bearing for Shafts; and I do hereby declare the following description and accompanying drawings are sufficient to enable any person skilled in the art or science to which it most nearly appertains to make and use my said invention or improvements without further invention or experiment.

My invention relates to an improved device known as an anti-frictional step or bearing for shafts, it being applicable to propeller-shafts, and all such as have a horizontal thrust, but more especially as a step for vertical shafts; and it consists in the introduction of water beneath the end of the shaft by a pressure sufficient to slightly elevate it. This is accomplished by means of a small force pump operated by the revolution of the shaft, while, by means of a discharge-cock on the opposite side, also operated by the shaft, the elevation to which it rises is always regulated and controlled.

To more fully describe my invention, reference is had to the accompanying drawings and letters marked thereon, of which—

Figure 1:
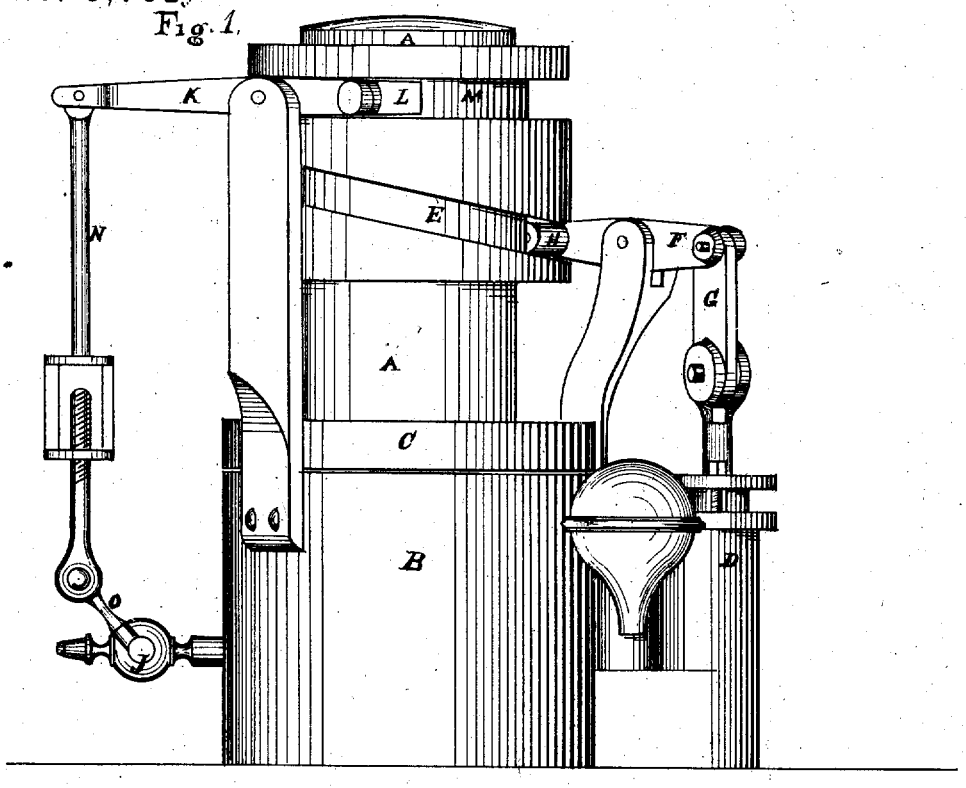
Figure 2:
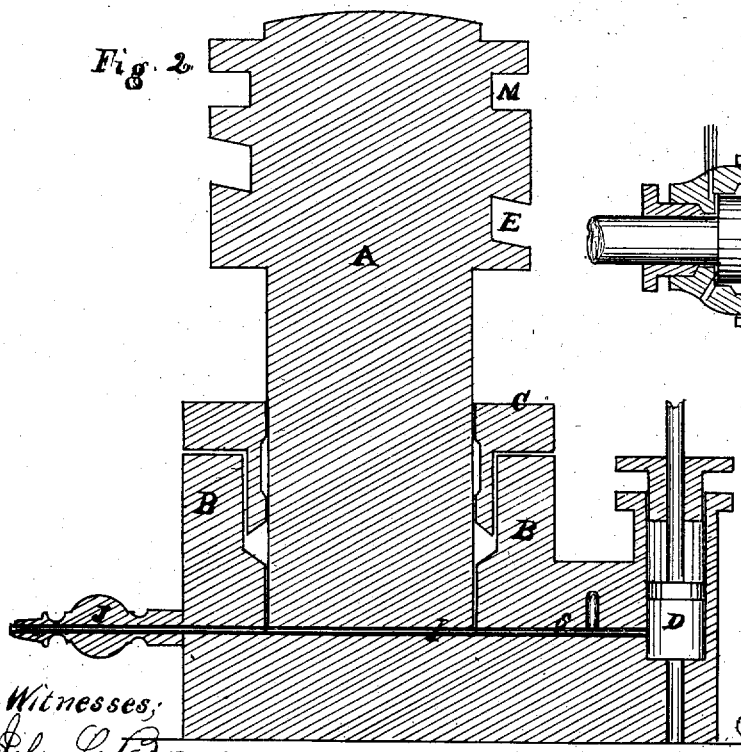

Figure 1 is a side elevation of my device. Fig. 2 is a sectional elevation.

Similar letters of reference on each of the figures indicate like parts.

A is a portion of the shaft, and B is the step in which it turns. The lower part of the shaft is turned off, and a stuffing-box is formed by the gland C, which prevents leakage from the pressure of the water or other lubricant. D is a small force-pump, which is operated as follows: A groove, E, is made around the shaft in such a manner as to act as a cam. The lower short lever F is attached at one end to the piston-rod by the link G, and carries, at its opposite end, a friction-roller, H, which operates within the groove or slot E, so that, as the shaft revolves, it is moved up and down alternately, thus operating the pump, and forcing water or other liquid beneath the shaft at I, Fig. 2. In order to prevent the shaft from being lifted by the pressure to a greater height than is desirable, I attach a discharge-cock, J, to one side of the step, and having a passage connecting with the interior. This cock is operated by means of the lever K, which has at one end a sliding block, L, or a friction-roller, which extends into a slot, M, which is turned around the shaft. The opposite end of the lever is connected with the handle O of the cock by a rod, N, having a turn-buckle in the center, by which its length may be changed and regulated at will.

When the shaft begins to revolve, it operates the pump, and forces water beneath the shaft, thus raising it from the bottom of the step. As the shaft is raised to a sufficient height, it turns the cock by means of the lever K, and allows the surplus water to escape, thus keeping the shaft at a constant height, while all friction on the step and necessity for lubricating are avoided.

The cock J and its operating mechanism in some instances may be dispensed with, if desired, and the liquid allowed to escape freely from beneath the shaft after lifting the shaft to a certain height, in which case the pump, with its connections, only will be used.

Figure 3:
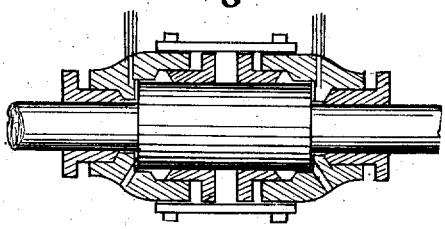

Various modifications may also be made on the arrangement of the different parts of the mechanism, but these are not essential, and will suggest themselves where needed. In the case of horizontal thrust, as in propellers, the same device may be used as shown in Fig. 3.

Having thus described my invention, what I claim, and desire to secure by Letters Patent, is—

1. The combination of the cam-groove E, roller H, lever F, and pump D, for forcing a lubricator beneath the shaft, substantially as described.

2. In combination with the above-named device, the discharge-cock J, operated by the crank or arm O, adjustable rod N, lever K, and groove M, substantially as and for the purpose set forth.

3. The combination of a pump, D, an oil-reservoir, a connecting-pipe, S, connecting-rods F G, and cam-grooved collar E, substantially as set forth.

4. The mode of lubricating shafts in which the lubricant forms the bearing, wholly or in part, within a tight journal, by means of pressure upon the lubricant, as set forth.

In witness whereof I have hereunto set my hand and seal.

JEROME HAAS. [L. S.]

Witnesses:

JOHN L. BOONE,

C. M. RICHARDSON.